US00RE43313E

(19) United States
(12) Reissued Patent
Bates et al.

(10) Patent Number: US RE43,313 E
(45) Date of Reissued Patent: *Apr. 17, 2012

(54) WIRELESS COMMUNICATION SYSTEMS AND METHODS

(75) Inventors: Benjamin G. Bates, Humble, TX (US); Scott Hahn, Meridian, ID (US)

(73) Assignee: Round Rock Research, LLC, Mount Kisco, NY (US)

( * ) Notice: This patent is subject to a terminal disclaimer.

(21) Appl. No.: 11/858,309

(22) Filed: Sep. 20, 2007

Related U.S. Patent Documents

Reissue of:
(64) Patent No.: 6,420,961
Issued: Jul. 16, 2002
Appl. No.: 09/079,449
Filed: May 14, 1998

U.S. Applications:
(63) Continuation of application No. 10/893,101, filed on Jul. 16, 2004, now Pat. No. Re. 41,916.

(51) Int. Cl.
*H04Q 5/22* (2006.01)

(52) U.S. Cl. ..... 340/10.1; 235/384; 141/94; 141/98; 141/230; 700/302

(58) Field of Classification Search ..... 340/10.1; 235/384, 361; 141/94, 98, 231; 700/302
See application file for complete search history.

(56) References Cited

U.S. PATENT DOCUMENTS 4,075,632 A 2/1978 Baldwin
4,360,810 A 11/1982 Landt et al.
4,782,342 A 11/1988 Walton
4,926,182 A 5/1990 Ohta et al.
5,003,619 A 3/1991 Morris et al.
5,006,996 A * 4/1991 Nakamura et al. ..... 700/215
5,053,774 A * 10/1991 Schuermann et al. ..... 340/10.34
5,055,968 A 10/1991 Nishi et al.
5,382,784 A 1/1995 Eberhardt
5,455,575 A * 10/1995 Schuermann ..... 342/42
5,485,370 A 1/1996 Moss et al.
5,565,858 A * 10/1996 Guthrie ..... 340/10.33
5,606,323 A 2/1997 Heinrich et al.
5,617,060 A 4/1997 Wilson et al.
5,621,412 A 4/1997 Sharpe et al.
5,623,531 A 4/1997 Nilssen
5,640,002 A 6/1997 Ruppert et al.

(Continued)

OTHER PUBLICATIONS

Bates, Benjamin, U.S. Appl. No. 11/858,316; "Wireless Communication Systems, Interfacing Devices, Communication Methods, Methods of Interfacing With An Interrogator, And Methods Of Operasting An Interrogator", filed Sep. 20, 2007.

(Continued)

*Primary Examiner* — Edwin Holloway, III
(74) *Attorney, Agent, or Firm* — Gazdzinski & Associates, PC

(57) ABSTRACT

The present invention includes wireless communication systems, interfacing devices, communication methods, methods of interfacing with an interrogator, and methods of operating an interrogator. According to one embodiment, a wireless communication system includes a remote communication device; an interrogator configured to output a forward link wireless communication and receive a reply link wireless communication from the remote communication device responsive to the forward link wireless communication; and an interface device configured to interface with the interrogator using a wireless medium[, the interrogator being configured to be controlled by the interface device].

30 Claims, 7 Drawing Sheets

U.S. PATENT DOCUMENTS

| | | | | |
|---|---|---|---|---|
| 5,649,296 | A | | 7/1997 | MacLellan et al. |
| 5,745,037 | A | * | 4/1998 | Guthrie et al. ..... 340/573.4 |
| 5,745,049 | A | * | 4/1998 | Akiyama et al. ..... 340/870.17 |
| 5,774,876 | A | * | 6/1998 | Woolley et al. ..... 705/28 |
| 5,850,187 | A | | 12/1998 | Carreneder et al. |
| 5,936,527 | A | | 8/1999 | Isaacman et al. |
| 5,940,006 | A | * | 8/1999 | MacLellan et al. ..... 340/10.1 |
| 5,952,935 | A | | 9/1999 | Meija et al. |
| 5,956,259 | A | | 9/1999 | Hartsell, Jr. et al. |
| 5,963,134 | A | | 10/1999 | Bowers et al. |
| 6,078,251 | A | * | 6/2000 | Landt et al. ..... 340/10.41 |
| 6,097,301 | A | | 8/2000 | Tuttle |
| 6,130,602 | A | | 10/2000 | O'Toole et al. |
| 6,150,921 | A | | 11/2000 | Werb et al. |
| 6,420,961 | B1 | | 7/2002 | Bates |
| 6,842,121 | B1 | | 1/2005 | Tuttle |

OTHER PUBLICATIONS

Bates, Benjamin, U.S. Appl. No. 11/873,286; "RFID SoftwareUpgradeable Readers and Printers", filed Oct. 16, 2007.

Bates, Benjamin, U.S. Appl. No. 10/893,101; "Wireless Communication Systems, Interfacing Devices, Communication Methods, Methods of Interfacing With An Interrogator, And Methods Of Operasting An Interrogator", filed Jul. 16, 2004.

Bates, Benjamin, U.S. Appl. No. 11/858,291; "Wireless Communication Systems, Interfacing Devices, Communication Methods, Methods of Interfacing With An Interrogator, And Methods Of Operasting An Interrogator", filed Sep. 20, 2007.

Bates, Benjamin, U.S. Appl. No. 11/858,297; "Wireless Communication Systems, Interfacing Devices, Communication Methods, Methods of Interfacing With An Interrogator, And Methods Of Operasting An Interrogator", filed Sep. 20, 2007.

USPTO Transaction History of U.S. Appl. No. 09/079,449, filed May 14, 1998, entitled "Wireless Communication Systems, Interfacing Devices, Communication Methods, Methods of Interfacing With An Interrogator, And Methods Of Operating An Interrogator," now U.S. Patent No. 6,420,961.

USPTO Transaction History of U.S. Appl. No. 10/893,101, filed Jul. 16, 2004, entitled "Wireless Communication Systems, Interfacing Devices, Communication Methods, Methods of Interfacing With An Interrogator, And Methods Of Operating An Interrogator."

USPTO Transaction History of U.S. Appl. No. 10/858,291, filed Sep. 20, 2007, entitled "Wireless Communication Systems, Interfacing Devices, Communication Methods, Methods of Interfacing With An Interrogator, And Methods Of Operating An Interrogator."

USPTO Transaction History of U.S. Appl. No. 11/858,297, filed Sep. 20, 2007, entitled "Wireless Communication Systems, Interfacing Devices, Communication Methods, Methods of Interfacing With An Interrogator, And Methods Of Operating An Interrogator."

USPTO Transaction History of U.S. Appl. No. 11/858,316, filed Sep. 20, 2007, entitled "Wireless Communication Systems, Interfacing Devices, Communication Methods, Methods of Interfacing With An Interrogator, And Methods Of Operating An Interrogator."

USPTO Transaction History of U.S. Appl. No. 11/873,286, filed Oct. 16, 2007, entitled "RFID Software Upgradeable Readers and Printers."

* cited by examiner

WIRELESS COMMUNICATION SYSTEMS AND METHODS

Matter enclosed in heavy brackets [ ] appears in the original patent but forms no part of this reissue specification; matter printed in italics indicates the additions made by reissue.

*RELATED REISSUE APPLICATIONS*

*The present application is a continuation application of U.S. patent application Ser. No. 10/893,101, filed Jul. 16, 2004, issued as U.S. Pat. No. Re. 41,916 on Nov. 9, 2010, which is a reissue application of U.S. Pat. No. 6,420,961 having U.S. patent application Ser. No. 09/079,449, filed May 14, 1998, the disclosures of which are incorporated herein by reference. More than one reissue application has been filed for the reissue of U.S. Pat. No. 6,420,961. The reissue applications are the initial reissue application Ser. No. 10/893, 101, filed Jul. 16, 2004, a continuation reissue application Ser. No. 11/858,291, filed Sep. 20, 2007, a continuation reissue application Ser. No. 11/858,297, filed Sep. 20, 2007, a continuation reissue application Ser. No. 11/858,309, filed Sep. 20, 2007, another continuation reissue application Ser. No. 11/858,316, filed Sep. 20, 2007 a divisional reissue application Ser. No. 11/873,286, filed Oct. 16, 2007.*

TECHNICAL FIELD

The present invention relates to wireless communication systems, interfacing devices, communication methods, methods of interfacing with an interrogator, and methods of operating an interrogator.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, now U.S. Pat. No. 6,130,602, issued Oct. 10, 2000, assigned to the assignee of the present application, and incorporated herein by reference. This application discloses the use of a radio frequency (RF) communication system including communication devices. The disclosed communication devices include an interrogator and a remote transponder, such as a tag or card.

Such communication systems can be used in various applications such as identification configurations. The interrogator is configured to output a polling or interrogation signal which may comprise a radio frequency signal including a predefined code. The remote transponders of such a communication system are operable to transmit an identification signal responsive to receiving an appropriate polling or interrogation signal.

More specifically, the appropriate transponders are configured to recognize the predefined code. The transponders receiving the code subsequently output a particular identification signal which is associated with the transmitting transponder. Following transmission of the polling signal, the interrogator is configured to receive the identification signals enabling detection of the presence of corresponding transponders.

Such communication, systems are useable in identification applications such as inventory or other object monitoring. For example, a remote identification device is attached to an object of interest. Responsive to receiving the appropriate polling signal, the identification device is equipped to output an identification signal. Generating the identification signal identifies the presence or location of the identification device and the article or object attached thereto.

Often it is desirable to access information which may be stored within the interrogator unit. Such information can be generated responsive to communications with the remote devices. The information can comprise qualitative as well as quantitative information regarding communications with remote transponders. In addition, it may be desirable to modify the interrogator after a period of time. It may be desired to change performance or operational characteristics of the interrogator. However, in numerous applications, access to the interrogator may be difficult or involve a considerable amount of time. Therefore, a need exists to provide improved access to interrogators of electronic identification systems.

SUMMARY OF THE INVENTION

The present invention includes wireless communication systems, interfacing devices, communication methods, methods of interfacing with an interrogator, and methods of operating an interrogator.

According to one aspect of the present invention, a wireless communication system is provided. The wireless communication system if includes at least one remote communication device, and an interrogator configured to output a forward link wireless communication and receive a reply link wireless communication from the remote communication device responsive to the forward link wireless communication. The system additionally includes an interface device configured to interface with the interrogator using a wireless medium. The interrogator is configured to receive control information from the interface device.

*In a second aspect of the invention, a system for performing radio frequency communications is disclosed. In one embodiment, the system includes a first device having one or more first antennas, a first integrated circuit communicatively coupled to the one or more and configured to communicate in a first mode and a second mode. The system also includes a second device having one or more second antennas and a second integrated circuit communicatively coupled to the one or more second antennas to communicate a first command to the first device using wireless communications. The first device is configured to receive identification numbers from radio frequency identification (RFID) tags in the first mode and is configured to wirelessly provide the identification numbers to the second device via a spread spectrum communications technique in the second mode.*

*In a third aspect of the invention, an interrogator is disclosed. In one embodiment, the interrogator includes one or more memories, a radio frequency (RF) section configured to handle two-way wireless communications with an interface device and a microcontroller communicatively coupled to the one or more memories and the RF section. The microcontroller is configured to operate in a first mode and a second mode with at least one of the first mode and the second mode allowing the interrogator to receive data via the RF section from at least one radio frequency device. The microcontroller determines identification information for at least one radio frequency device without presence of the interface device. The two-way wireless communications is configured to enable a*

*transfer of bits from the interrogator to the interface device and to enable a transfer of bits from the interface device to the interrogator. The microcontroller is also configured to receive control signals from the interface device via the RF section.*

*In a fourth aspect of the invention, a method for communicating data in a radio frequency system is disclosed. In one embodiment, the method includes detecting, by a first device, a second device via a wireless communication of data. The first device operates in a first mode enabled to wirelessly receive identification information from a plurality of remote communication devices via a communication technique. The first device is capable of operating in the first mode without the second device. The first device also includes one or more antennas to communicate with the remote communication devices and the second device. The method further includes receiving at the first device control signals from the second device and transferring data from the first device to the second device. The data includes the identification information and the first device is capable of using a spread spectrum communications technique.*

According to some aspects of the invention, the interrogator is configured to operate as a slave device and master device depending upon the mode of operation of the communications system. The interrogator operates as a master during normal modes of operation, and as a slave during maintenance modes of operation.

A communication method according to another aspect of the present invention includes providing an interrogator and at least one remote communication device, and communicating intermediate the interrogator and the remote communication device. The method also includes providing an interface device, reading control information from the interface device using the interrogator, and communicating data intermediate the interrogator and the interface device responsive to the control information.

BRIEF DESCRIPTION OF THE DRAWINGS

Preferred embodiments of the invention are described below with reference to the following accompanying drawings.

FIG. 5 is a circuit schematic of a transponder included in the remote communication device of FIG. 3.

FIG. 6 is a functional block diagram of an interrogator of the communication system.

FIG. 7 is a functional block diagram illustrating one embodiment of an interface device communicating with an interrogator of the communication system.

DETAILED DESCRIPTION OF THE PREFERRED EMBODIMENTS

This disclosure of the invention is submitted in furtherance of the constitutional purposes of the U.S. Patent Laws "to promote the progress of science and useful arts"(Article 1, Section 8).

Figure 1:
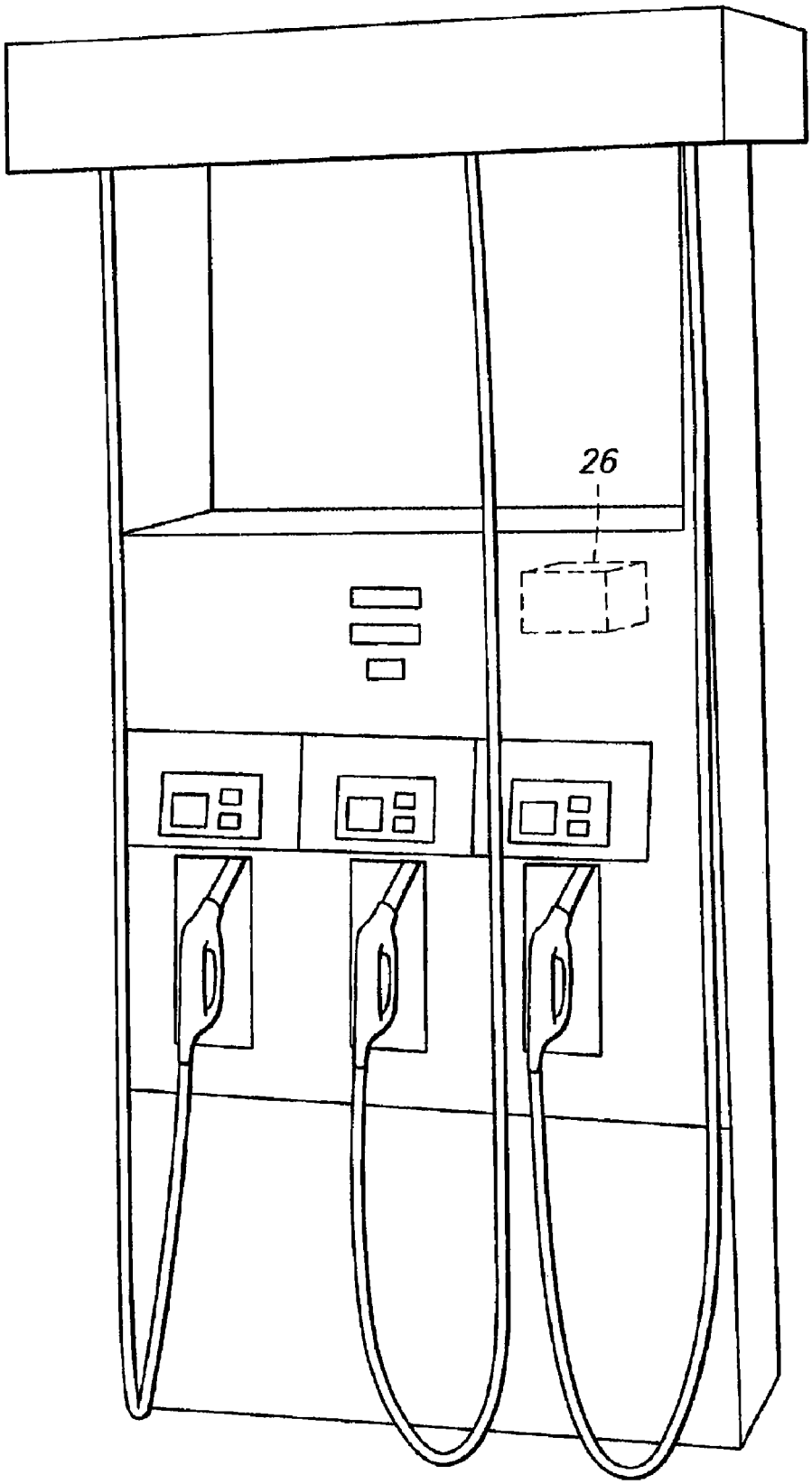
FIG. 1 is an illustrative diagram illustrating one application of a communication system which embodies the present invention.

Referring to FIG. 1, an interrogator 26 of a communication system is provided within a fuel dispenser. The illustrated application of the communication system is exemplary. Interrogator 26 can be utilized to monitor the presence of users accessing product from the dispenser via a wireless link as discussed below. Such users would be equipped with remote communication devices (not shown in FIG. 1) which are configured to communicate with interrogator 26.

Given the implementation of interrogator 26 within the dispenser assembly, a communication system according to the present invention is preferably utilized to conveniently interface with interrogator 26. In particular, data may be communicated via a wireless link intermediate interface devices (also not shown in FIG. 1) and interrogator 26.

Figure 2:
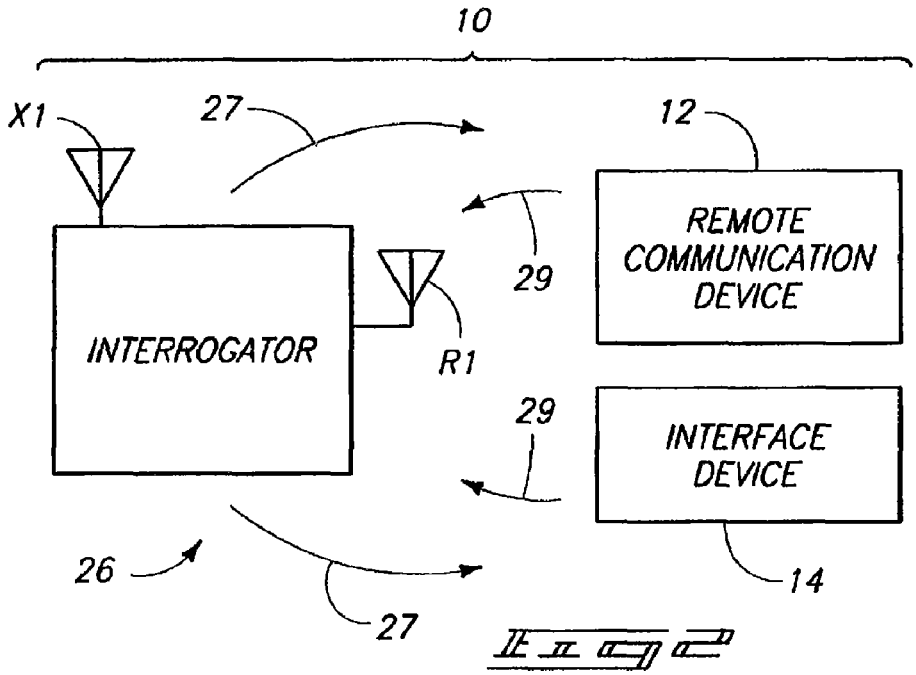
FIG. 2 is a block diagram of an exemplary communication system.

FIG. 2 illustrates a wireless communication system 10 embodying the invention. Communication system 10 comprises an electronic identification system in the embodiment described herein. Communication system 10 can be utilized in the dispenser application described above as well as other communication applications.

The depicted communication system 10 includes an interrogator 26. Communication system 10 further includes an electronic wireless remote communications device 12, such as the device disclosed in U.S. patent application Ser. No. 08/705,043, filed Aug. 29, 1996. Devices 12 can be referred to as radio frequency identification devices (RFID) or remote intelligent communication (RIC) devices. Plural remote communication devices 12 typically communicate with interrogator 26 although only one such device 12 is illustrated in FIG. 2. In one embodiment, wireless remote communications device 12 comprises a wireless identification device such as the MicroStamp (™) integrated circuit available from Micron Communications, Inc., 3176 S. Denver Way, Boise, Id. 83705. Such a remote communication device 12 can be referred to as a tag or card as illustrated below.

In the embodiment illustrated in FIG. 2, multiple communications devices 12 can be employed; however, there is typically no communication between multiple devices 12. Instead, the multiple communications devices 12 communicate with interrogator 26. Multiple communications devices 12 can be used in the same field of an interrogator 26 (i.e., within communications range of interrogator 26). Similarly, multiple interrogators 26 can be in proximity to one or more of devices 12.

The above described system 10 is advantageous over prior art devices that utilize magnetic field effect systems because, with system 10, a greater range can be achieved, and more information can be obtained (instead of just an identification number). As a result, such a system 10 can be used, for example, to monitor large warehouse inventories having many unique products needing individual discrimination to determine the presence of particular items within a large lot of tagged products.

Communication system 10 of the present invention also includes an interface device 14. Interface device 14 is also referred to as a maintenance or calibration device or tag. Interrogator 26 is configured to communicate with one or more remote communication devices 12 during a normal mode of operation. As described in detail below, interrogator 26 is configured to communicate with interface device 14 during maintenance and/or calibration modes of operation.

Communications during the normal mode of operation typically include communicating data of a first clearance level intermediate devices 12 and interrogator 26. Such data can include tag or device 12 identification information, associated product information (i.e., data regarding the product to which the tag is attached), etc.

Communications during the maintenance mode typically provide communications of data having a clearance level higher than first level data. The maintenance mode communications are provided intermediate interrogator 26 and interface device 14. Exemplary higher level data includes software update code and update hardware configuration information read from interface device 14 into interrogator 26. Such update data can be utilized to reconfigure interrogator 26.

Other exemplary higher level information includes operational profile information (e.g., temperature profile) or status information of interrogator 26, and log files including data regarding communications of remote communication devices 12 with interrogator 26. Higher level information can additionally include RF power information corresponding to wireless communications of system 10. Further, interface device 14 can write or output command or control information to interrogator 26 to operate or stimulate interrogator 26. Interrogator 26 can read the control information and thereafter communicate data with device 14.

Remote communication device 12 and interface device 14 are configured to interface with interrogator 26 using a wireless medium in one embodiment. Interrogator 26 communicates with the communication device 12 and interface device 14 via an electromagnetic link, such as an RF link (e.g., at microwave frequencies) in the described embodiment. Interrogator 26 is configured to output forward link wireless communications 27. Further, interrogator 26 is operable to receive reply link wireless communications 29 from devices 12, 14 responsive to outputting of forward link communication 27.

In particular, interrogator unit 26 includes a plurality of antennas X1, R1, as well as transmitting and receiving circuitry, similar to that implemented in devices 12 described below. Antenna X1 comprises a transmit antenna and antenna R1 comprises a receive antenna individually connected to interrogator 26. In operation, interrogator 26 transmits the interrogation signal or forward link command 27 via antenna X1. Communication device 12 and interface device 14 are operable to receive the incoming forward link signal. Upon receiving signal 27, communication device 12 and interface device 14 are operable to respond by generating and transmitting a responsive reply or return signal 29. The interrogator 26 is described in greater detail below.

In one embodiment, the responsive signal 29 is encoded with information that uniquely identifies, or labels the particular device 12, 14 that is transmitting, so as to identify any object or person with which communications device 12 is associated, or identify device 14 as a maintenance device.

The reply link wireless communication can be outputted by remote communication device 12 or interface device 14 according to the operational mode of communication system 10. In the described embodiment, remote device 12 and interface device 14 are configured to output an identification signal within reply link communications 29 responsive to receiving a forward link wireless communication 27. Interrogator 26 is configured to receive and recognize the identification signal within the return or reply link communication 29. The identification signal can be utilized to identify interface device 14 as a maintenance or calibration device, or identify the particular transmitting communication device 12.

Interrogator 26 is configured to communicate with remote device 12 in normal operational modes. Typical radio frequency communications occur intermediate interrogator 26 and remote communication devices 12 for use in identification systems and product monitoring as exemplary applications.

Responsive to identifying a responding device as an interface device 14, interrogator 26 is configured to operate in a maintenance or calibration mode of operation. Operation of interrogator 26 in the maintenance/calibration mode of operation provides interfacing of interrogator 26 with interface device 14. In this mode, higher level data can be communicated intermediate interface device 14 and interrogator 26. Interface device 14 is configured to load data into interrogator 26 and retrieve data from interrogator 26 using a wireless medium. Wireless communications of devices 12, 14 with interrogator 26 occur utilizing radio frequency (RF) configurations in the described embodiment of the invention. Other configurations such as infrared, acoustic, etc. are possible.

The maintenance/calibration mode of operation can be defined as a master/slave relationship wherein interface device 14 operates as the master and interrogator 26 operates as a slave device. During normal modes of operation, interrogator 26 typically operates as the master device while remote communication devices 12 operate as slave devices.

Figure 3:
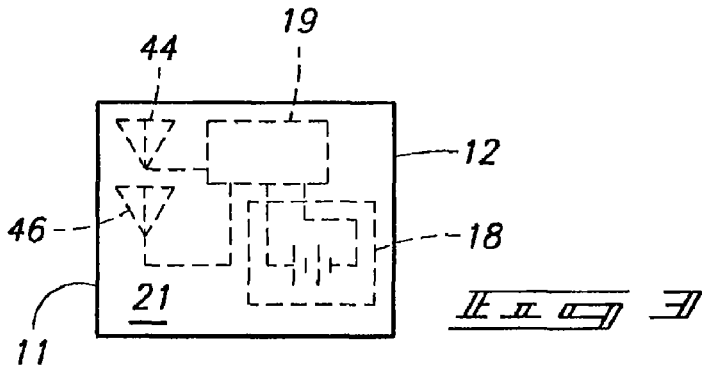
FIG. 3 is a front view of a radio frequency remote communication device according to one embodiment of the invention.

Referring to FIG. 3, one embodiment of remote communication device 12 is illustrated. The depicted communication device 12 includes a transponder 16 having a receiver and a transmitter as described below. Communication device 12 further includes a power source 18 connected to transponder 16 to supply operational power to transponder 16.

In the illustrated embodiment, transponder 16 is in the form of an integrated circuit. However, in alternative embodiments, all of the circuitry of transponder 16 is not necessarily all included in a single integrated circuit.

Power source 18 is a thin film battery in the illustrated embodiment, however, in alternative embodiments, other forms of power sources can be employed. If the power source 18 is a battery, the battery can take any suitable form. Preferably, the battery type will be selected depending on weight, size, and life requirements for a particular application. In one embodiment, battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

Communications device 12 further includes at least one antenna connected to transponder 16 for wireless transmission and reception. In the illustrated embodiment, communication device 12 includes at least one receive antenna 44 connected to transponder 16 for radio frequency reception by transponder 16, and at least one transmit antenna 46 connected to transponder 16 for radio frequency transmission by transponder 16. The described receive antenna 44 comprises a loop antenna and the transmit antenna 46 comprises a dipole.

The communications device 12 can be included in any appropriate housing or packaging. FIG. 3 shows but one example of a housing in the form of a miniature housing 11 encasing the device 12 to define a tag which can be supported by an object (e.g., hung from an object, affixed to an object, etc.).

Figure 4:
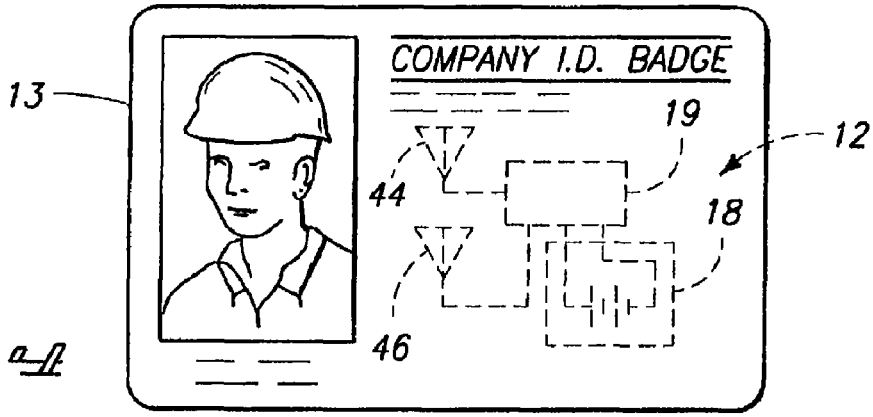
FIG. 4 is a front view of an employee badge according to another embodiment of the invention.
Figure 3:
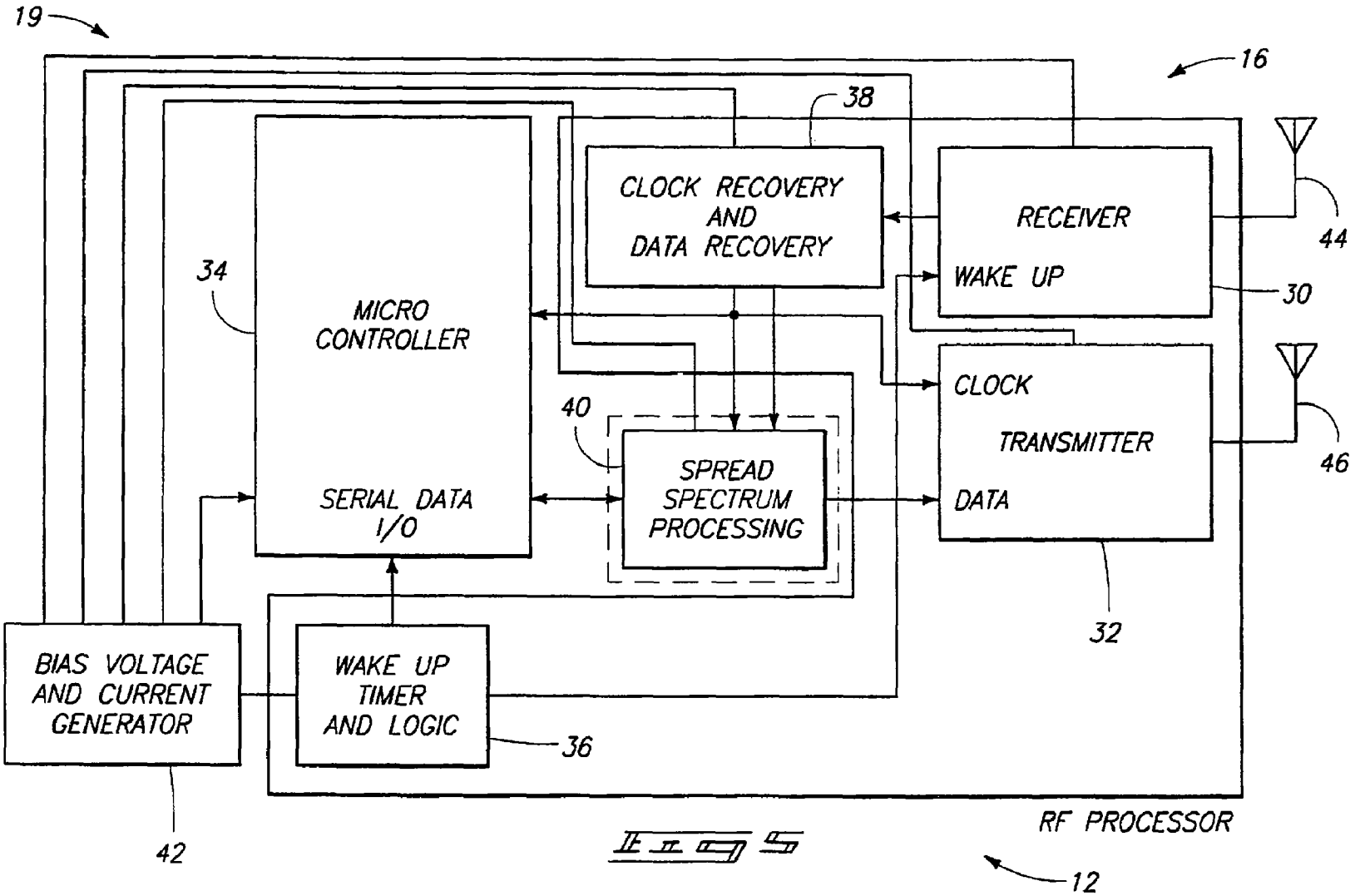
Figure 4:
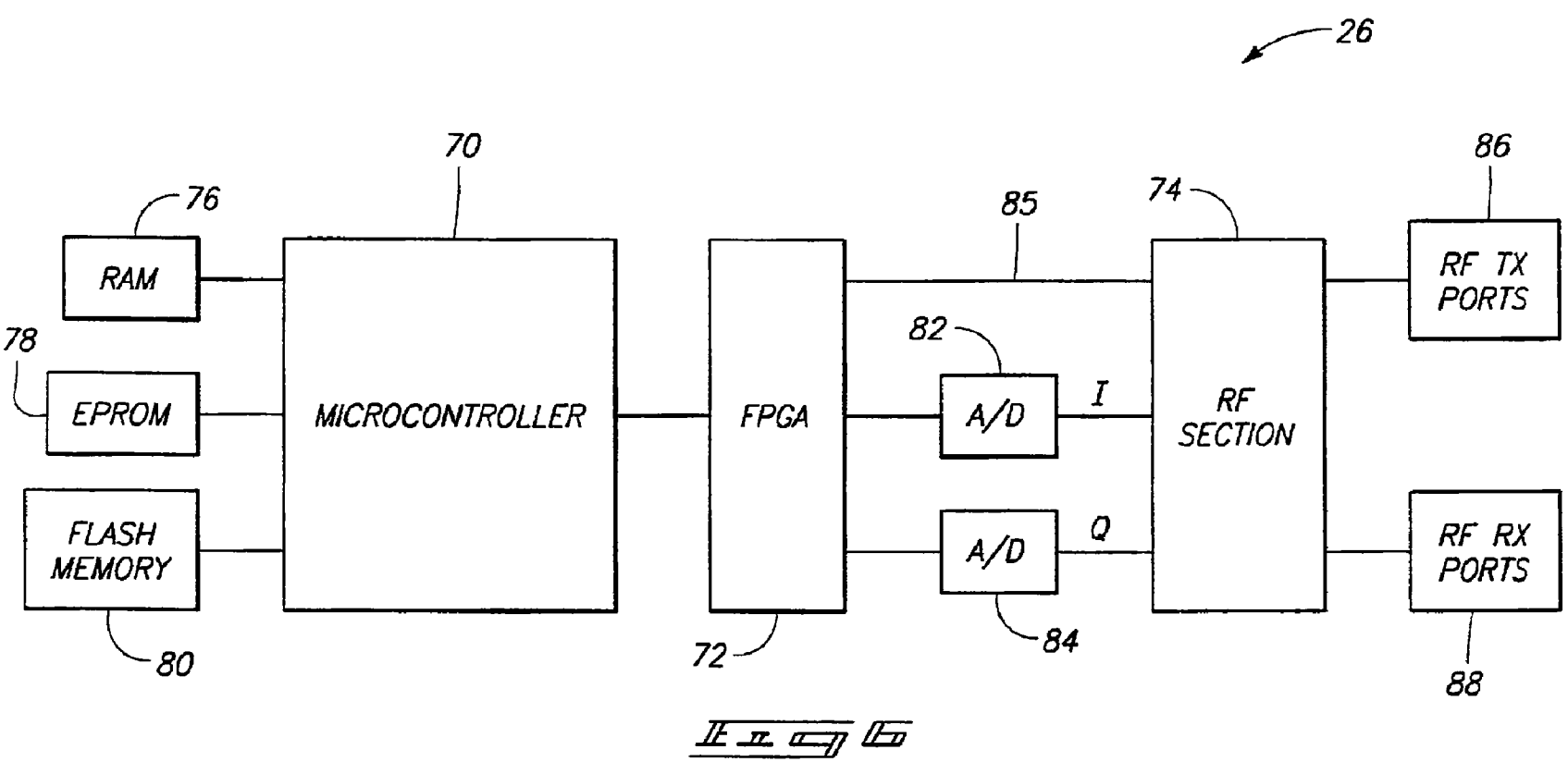
Figure 11:
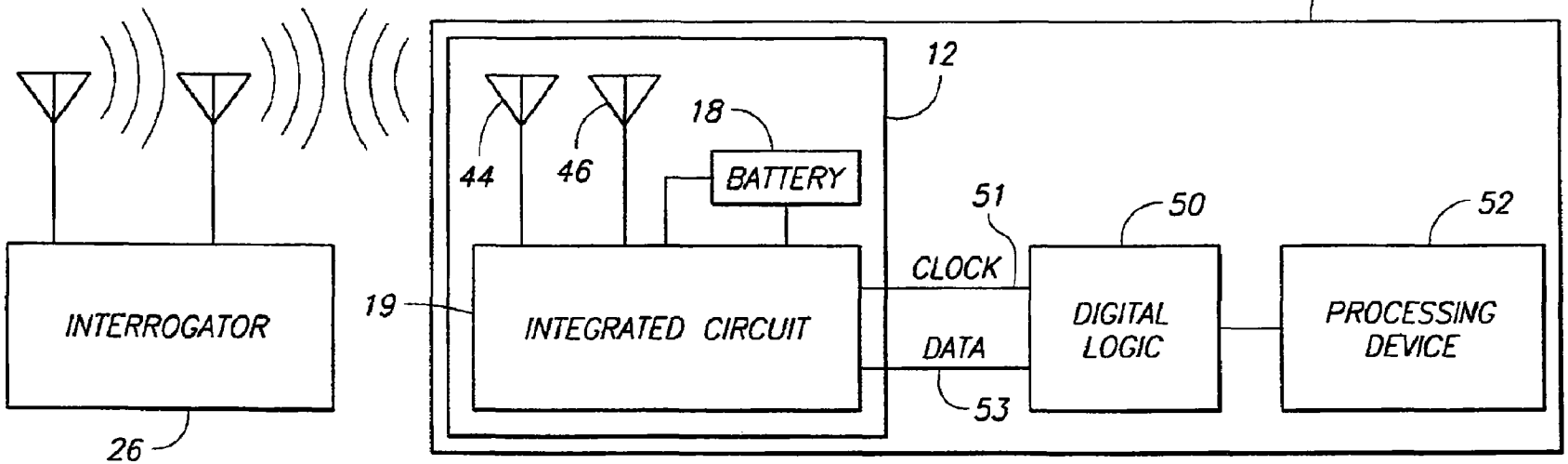

Referring to FIG. 4, an alternative housing is illustrated. FIG. 4 shows a housing in the form of a card 13. Card 13 preferably comprises plastic or other suitable material. Plastic card 13 houses communication device 12 to define an employee identification badge including the communication device 12. In one embodiment, the front face of card 13 has visual identification features such as an employee photograph or a fingerprint in addition to identifying text.

Although two particular types of housings have been disclosed, the communications device 12 can be included in any appropriate housing. Communications device 12 is preferably of a small size that lends itself to applications employing small housings, such as cards, miniature tags, etc. Larger housings can also be employed. The communications device 12, provided in any appropriate housing, can be supported from or attached to an object in any desired manner.

FIG. 5 is a high level circuit schematic of the transponder 16 utilized in the devices of FIGS. 2-4. In the embodiment shown in FIG. 5, transponder 16 is implemented within a monolithic integrated circuit 19. In particular, the integrated circuit preferably comprises a small outline integrated circuit (SOIC) package. In the illustrated embodiment, the integrated circuit 19 comprises a single die, having a size of 209×116 mils$^2$, including a receiver 30, transmitter 32, microcontroller or microprocessor 34, a wake up timer and logic circuit 36, a clock recovery and data recovery circuit 38, and a bias voltage and current generator 42. Receiver 30 and transmitter 32 comprise wireless communication circuitry configured to communicate wireless signals.

In one embodiment, the communications devices 12 switch between a "sleep" mode of operation, and higher power modes to conserve energy and extend battery life during periods of time where no interrogation signal 27 is received by devices 12, using the wake up timer and logic circuitry 36.

In one embodiment, a spread spectrum processing circuit 40 is included in transponder 16. In this embodiment, signals transmitted and received by interrogator 26, and transmitted and received by communications device 12 and interface device 14 are modulated spread spectrum signals. Many modulation techniques minimize required transmission bandwidth. However, the spread spectrum modulation techniques employed in the illustrated embodiment require a transmission bandwidth that is up to several orders of magnitude greater than the minimum required signal bandwidth. Although spread spectrum modulation techniques are bandwidth inefficient in single user applications, they are advantageous where there are multiple users, as is the case with the preferred radio frequency identification communication system 10 of the present invention.

The spread spectrum modulation technique of the illustrated embodiment is advantageous because the interrogator signal can be distinguished from other signals (e.g., radar, microwave ovens, etc.) operating at the same frequency. The spread spectrum signals transmitted by communications device 12, interface device 14 and interrogator 26 are pseudo random and have noise-like properties when compared with the digital command or reply. The illustrated embodiment employs direct sequence spread spectrum (DSSS) modulation.

In operations, interrogator 26 sends out a command that is spread around a certain center frequency (e.g, 2.44 GHz). After the interrogator transmits the command, and is expecting a response, the interrogator switches to a CW mode (continuous wave mode) for backscatter communications. In the continuous wave mode, interrogator 26 does not transmit any information. Instead, the interrogator just transmits 2.44 GHz radiation. In other words, the signal transmitted by the interrogator is not modulated. After communications device 12 or interface device 14 receives the forward link communication from interrogator 26, communications device 12 or interface device 14 (if present) processes the command.

If communications device 12 and\or interface device 14 is in a backscatter mode, it alternately reflects or does not reflect the signal from the interrogator to send its reply. For example, in the illustrated embodiment, two halves of a dipole antenna are either shorted together or isolated from each other to send a reply. Alternatively, devices 12, 14 can communicate in an active mode.

In one embodiment, the clock for transponder 16 is extracted from the incoming message itself by clock recovery and data recovery circuitry 38. This clock is recovered from the incoming message, and used for timing for microcontroller 34 and all the other clock circuitry on the chip, and also for deriving the transmitter carrier or the subcarrier, depending on whether the transmitter is operating in active mode or backscatter mode.

In addition to recovering a clock, the clock recovery and data recovery circuit 38 also performs data recovery on valid incoming signals. The valid spread spectrum incoming signal is passed through the spread spectrum processing circuit 40, and the spread spectrum processing circuit 40 extracts the actual ones and zeros of data from the incoming signal. More particularly, the spread spectrum processing circuit 40 takes chips from the spread spectrum signal, and reduces individual thirty-one chip sections down to a bit of one or zero, which is passed to microcontroller 34.

Microcontroller 34 includes a serial processor, or I/O facility that receives the bits from spread spectrum processing circuit 40. The microcontroller 34 performs further error correction. More particularly, a modified hamming code is employed, where each eight bits of data is accompanied by five cheek bits used by the microcontroller 34 for error correction. Microcontroller 34 further includes a memory, and after performing the data correction, microcontroller 34 stores bytes of the data bits in memory. These bytes contain a command sent by the interrogator 26. Microcontroller 34 is configured to respond to the command.

For example, interrogator 26 may send a command requesting that any communication device 12 or interface device 14 in the field respond with the device's identification number. Status information can also be returned to interrogator 26 from communication devices 12. Interrogator 26 can be configured to enter the maintenance or calibration mode responsive to receiving a reply from interface device 14.

Communications from interrogator 26 (i.e., forward link communications) and devices 12, 14 (i.e., return link communications) have a similar format. More particularly, the forward and reply communications begin with a preamble, followed by a Barker or start code, followed by actual data in the described embodiment. The incoming forward link message and outgoing reply preferably also include a check sum or redundancy code so that transponder 16 or interrogator 26 can confirm receipt of the entire message or reply.

Communication devices 12 typically include an identification sequence identifying the particular tag or device 12 sending the reply. Such implements the identification operations of communication system 10. Interface devices 14 can include an identifying sequence or signal which specifies the communicating device as an interface maintenance and/or calibration tag 14. Following identification of an interface device 14, interrogator 26 can be configured to enter the calibration or maintenance mode of operation.

After sending a command, interrogator 26 sends a continuous unmodulated RF signal with an approximate frequency of 2.44 GHz. Return link data can be Differential Phase Shift Key (DPSK) modulated onto a square wave subcarrier with a frequency of approximately 600 kHz (e.g., 596.1 kHz in one embodiment). A data 0 corresponds to one phase and data 1 corresponds to another, shifted 180 degrees from the first phase. The subcarrier is used to modulate antenna impedance of transponder 16. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. In one embodiment, the dipole antenna is a printed microstrip half wavelength dipole antenna.

Referring to FIG. 6, one embodiment of interrogator 26 is illustrated. The depicted interrogator 26 includes a microcontroller 70, a field programmable gate array (FPGA) 72, and RF section 74. In the depicted embodiment, microcontroller 70 comprises a MC68340 microcontroller available from Motorola, Inc. FPGA 72 comprises a XC4028 device available from Xilinx, Inc.

RAM 76, EPROM 78 and flash memory 80 are coupled with microcontroller 70 in the depicted embodiment. Microcontroller 70 is configured to access an applications program for controlling the interrogator 26 and interpreting responses from devices 12, 14. The processor of microcontroller 70 is configured to control communication operations with remote communication devices 12 during normal modes of operation. The applications program can also include a library of radio frequency identification device applications or functions. These functions effect radio frequency communications between interrogator 26 and communications device 12 and interface device 14.

Plural analog to digital converters 82, 84 are implemented intermediate FPGA 72 and RF section 74 for both in-phase (I) and quadrature (Q) communication lines. Plural RF transmit (TX) ports 86 and plural RF receive (RX) ports 88 are coupled with RF section 74 in the depicted embodiment. Providing plural TX ports and RX ports 86, 88 enables interrogator 26 to minimize the effects of multipath when communicating with plural remote communication devices 12, 14.

RF section 74 is configured to handle wireless (e.g., radio frequency) communications with interface device 14 and remote communication devices 12. Analog to digital converters 82, 84 provide received analog RF signals into a digital format for application to FPGA 72. Digital signals output from FPGA 72 are converted to RF signals by RF section 74.

FPGA 72 is configured to format forward link communications received from microcontroller 70 into a proper format for application to RF section 74 for communication. Further, FPGA 72 is configured to demodulate reply link communications received from remote communication devices 12 and interface 14 via RF section 74. Such demodulated reply link signals can be applied to microcontroller 70 for processing. An additional connection 85 is provided intermediate FPGA 72 and RF section 74. Such can be utilized to transmit phase lock loop (PLL) information, antenna diversity selection information and other necessary communication information.

Microcontroller 70 is configured to control operations of interrogator 26 including outputting of forward link communications and receiving reply link communications. EPROM 78 is configured to store original code and settings selected for the particular application of communication system 10. Flash memory 80 is configured to receive software code updates forwarded from interface device 14 during maintenance modes of operation. Such software updates can include user code in one embodiment. In addition, hardware updates can be uploaded from interface device 14 to interrogator 26. Such hardware updates can be utilized to reconfigure FPGA 72.

RAM device 76 is configured to store data during operations of communication system 10. Such data can include information regarding or corresponding to communications with associated remote communication devices 12 and status information of interrogator 26 during normal modes of operation. In addition, interrogator 26 can be configured to store other information regarding communication system 10 operations depending upon the particular application. Such information can be retrieved and received by interface device 14 during maintenance and calibration modes of operation.

Referring to FIG. 7, a first configuration of interface device 14 is shown interfacing with interrogator 26. The depicted interface device 14 comprises a remote communication device 12 coupled with digital logic 50 and a processing device 52.

Interrogator 26 and interface device 14 are operable to communicate via a wireless medium (e.g., RF link). In certain embodiments, interrogator 26 and remote communication device 12 of interface device 14 are configured to communicate using backscatter communications. Integrated circuit 19 includes a backscatter modulator in one embodiment. Remote communication device 12 of device 14 includes a processor and wireless communication circuitry coupled to the processor and configured to communicate wireless signals.

Responsive to the reception of a forward link communication from interrogator 26, transponder of integrated circuit 19 of interface device 14 is configured to output an identification signal within the reply link communication identifying interface device 14. Interrogator 26 detects device 14 using the identification signal. Thereafter, communications within communication system 10 can proceed in the maintenance and/or calibration mode of operation. Processing device 52 can act as a master to control communication operations between interface device 14 and interrogator 26, and interrogator 26 operates in a slave mode during the maintenance/calibration modes of operation in the described embodiment.

Digital logic 50 is configured to interface with a variety of remote communication device 12 configurations. Digital logic 50 can interface with existing tag, stamp, card and other remote communication device configurations. Interfacing with existing remote communication device configurations permits the remote communication devices 12 to perform in a similar manner to other remote communication devices 12 within the communication systems 10 utilized for identification or other communication purposes.

Digital logic 50 receives clock information from transponder of integrated circuit 19 via connection 51. A bi-directional serial data path 53 couples integrated circuit 19 and digital logic 50. Data path 53 can be referred to as a digital port. Remote communication device 12 utilized within interface device 14 is configured to provide access of the clock signal and bi-directional data signal for interfacing with digital logic 50 and processing device 52.

In the depicted arrangement, processing device 52 comprises a notebook computer utilizing a Pentium(TM) processor available from Intel Corporation. Digital logic 50 comprises an interface providing bi-directional communication of data between remote communication device 12 and processing device 52. Processing device 52 is coupled with the processor of device 12 and is operable to output data to device 12 and/or receive data from device 12 and interrogator 26.

Interface device 14 and interrogator 26 are configured to communicate data therebetween. Depending upon the particular application, communicated data can be tailored to the particular operating environment. In addition, flexibility is permitted wherein software can be loaded into interrogator 26 using processing device 52 and the associated RF link intermediate interface device 14 and interrogator 26.

Processing device 52 can be utilized to program commands for operating interrogator 26. Interrogator 26 is configured to read higher level data commands from processing device 52 utilizing data connection 53 intermediate processing device 52 and integrated circuit 19 and the RF link between device 14 and interrogator 26. In another embodiment, the higher level data (e.g., software code updates) may be provided using processing device 52 and communicated to interrogator 26 using remote communication device 12 of device 14. The higher level data can be loaded into interrogator 26 utilizing the wireless medium or RF link. Such data comprising updated software can include improvements for existing design configurations. Responsive to commands outputted from processing device 52 of interface device 14, stored higher level data within RAM 76 can be downloaded to and received by interface device 14. Processing device 52 can be configured to store received data from interrogator 26 for storage, analysis and display.

Processing device 52 comprises a data collector in one embodiment which is configured to interface with a variety of form factors of the remote communication devices (e.g., tags, cards, etc.) 12 via a digital data port upon device 12. Such enables a given interrogator installation to be tested and accessed using the specific form factor of remote communication device 12 to be utilized in the communication system installation. The remote communication device 12 of interface device 14 can be powered utilizing battery power or an external power source.

Figure 8:
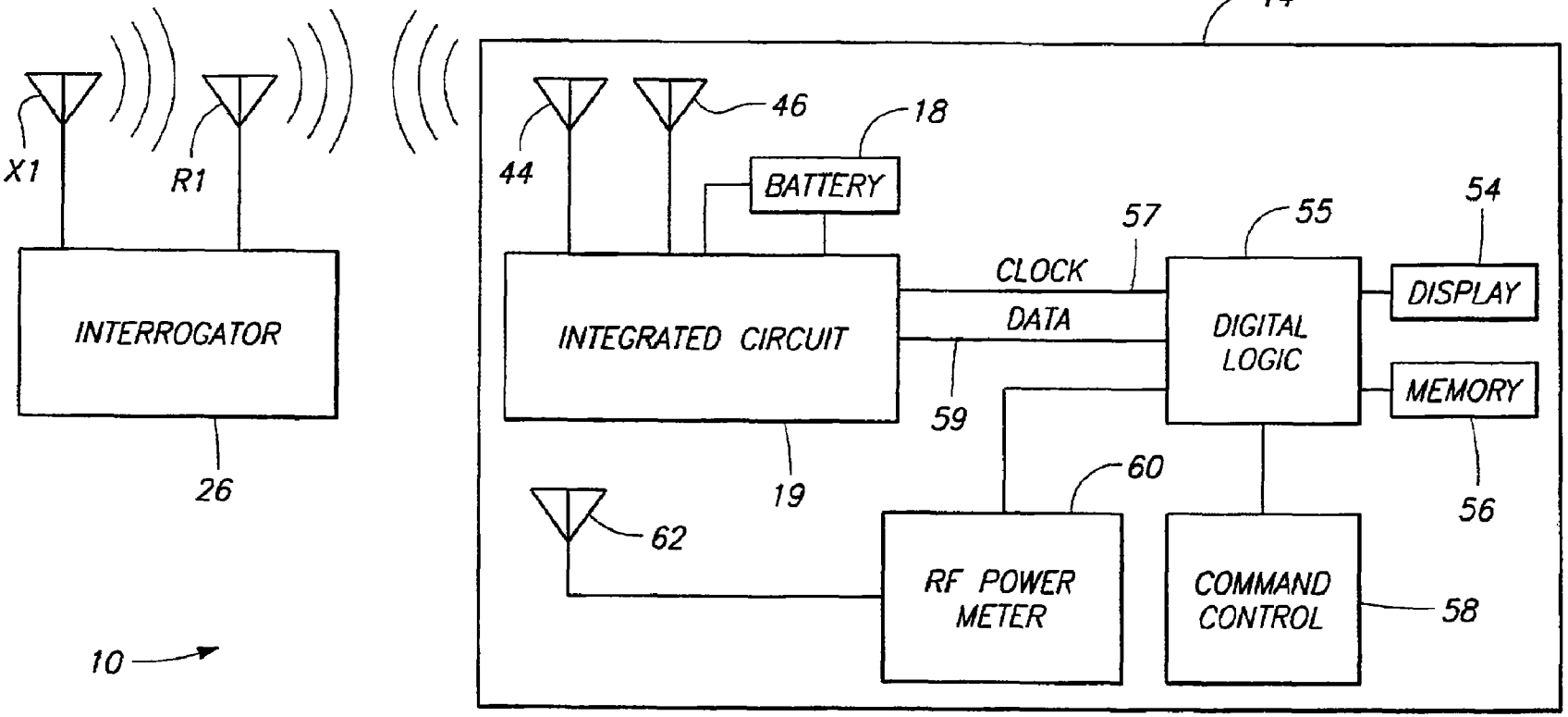
FIG. 8 illustrates another embodiment of an interface device communicating with the interrogator.

Referring to FIG. 8, communications of another interface device 14 configuration with interrogator 26 are described. The depicted interface device 14 is intended to be a self-contained hand-held maintenance, calibration and monitoring device. Preferably, the depicted interface device 14 is portable for field use.

The illustrated interface device 14 comprises an integrated circuit 19 and battery 18 coupled with corresponding circuitry. In particular, such corresponding circuitry includes digital logic 55 coupled via a clock connection 57 and bidirectional data line 59 with integrated circuit 19.

A display 54 and memory 56 are additionally coupled with digital logic 55. Display 54 can comprise a liquid crystal display and memory 56 can comprise SRAM memory. Display 54 includes a sixteen character display in the described embodiment. Display 54 is coupled with wireless communications circuitry of transponder 16 via digital logic 50 and is configured to display data for viewing by an operator. Memory 56 comprises a 512 kbyte battery backed SRAM in the described embodiment. Memory 56 is operable to store data to be outputted to and/or received data from interrogator 26. A command control 58 is also illustrated coupled with digital logic 55. An RF power meter 60 is connected with a corresponding RF antenna 62 and transponder of integrated circuit 19. Power meter 60 is configured to monitor the power of wireless communications intermediate interface device 14 and interrogator 26.

The transponder of integrated circuit 19 includes wireless communication circuitry configured to communicate wireless signals with interrogator 26 as described previously. The wireless communication circuitry of the transponder is configured to, in a preferred embodiment, output data to interrogator 26 and receive data from interrogator 26. In other configurations, only unidirectional communications are provided intermediate the transponder of device 14 and interrogator 26. Digital logic 55 coupled with integrated circuit 19, display 54, memory 56, command control 58, and RF power meter 60 is configured to route communications intermediate the appropriate component and the transponder of integrated circuit 19.

Command control 58 is configured to control the selection of commands outputted to interrogator 26. In particular, in the described embodiment, interrogator 26 is configured to follow a variety of commands once the maintenance or calibration mode of operation has been entered. A user of interface device 14 can input a desired command utilizing command control 58. In one embodiment of interface device 14, command control 58 comprises a test number select enabling one hundred different tests or commands to be communicated to interrogator 26.

For example, the user may specify that new software is to be uploaded to interrogator 26. Following inputting of the command using command control 58 and transmission to interrogator 26, interrogator 26 is configured to receive or read the updated software stored in memory 56 of interface device 14 via the RF link.

In the described embodiment, memory 56 is configured to store either data to be outputted to interrogator 26 or data received from interrogator 26. Such data can include higher level data as described previously.

Responsive to a predefined command entered utilizing command control 58, interrogator 26 is operable to monitor the radio frequency (RF) power intermediate interface device 14 and interrogator 26. RF power meter 60 is configured to measure the RF field strength of antennas of interrogator 26. Such an interface device 14 is configured to verify antenna installations of interrogator 26. The information can be determined utilizing RF power meter 60 and dedicated antenna 62. Interrogator 26 can instruct RF power meter 60 to monitor the power level and display the results using display 54 responsive to an appropriate command from command control 58. Further, interrogator 26 can adjust communications responsive to data received from meter 60. Interface device 14 can also be configured to transfer large amounts of data to/from interrogator 26 via a wireless medium utilizing transponder of integrated circuit 19.

Figure 9:
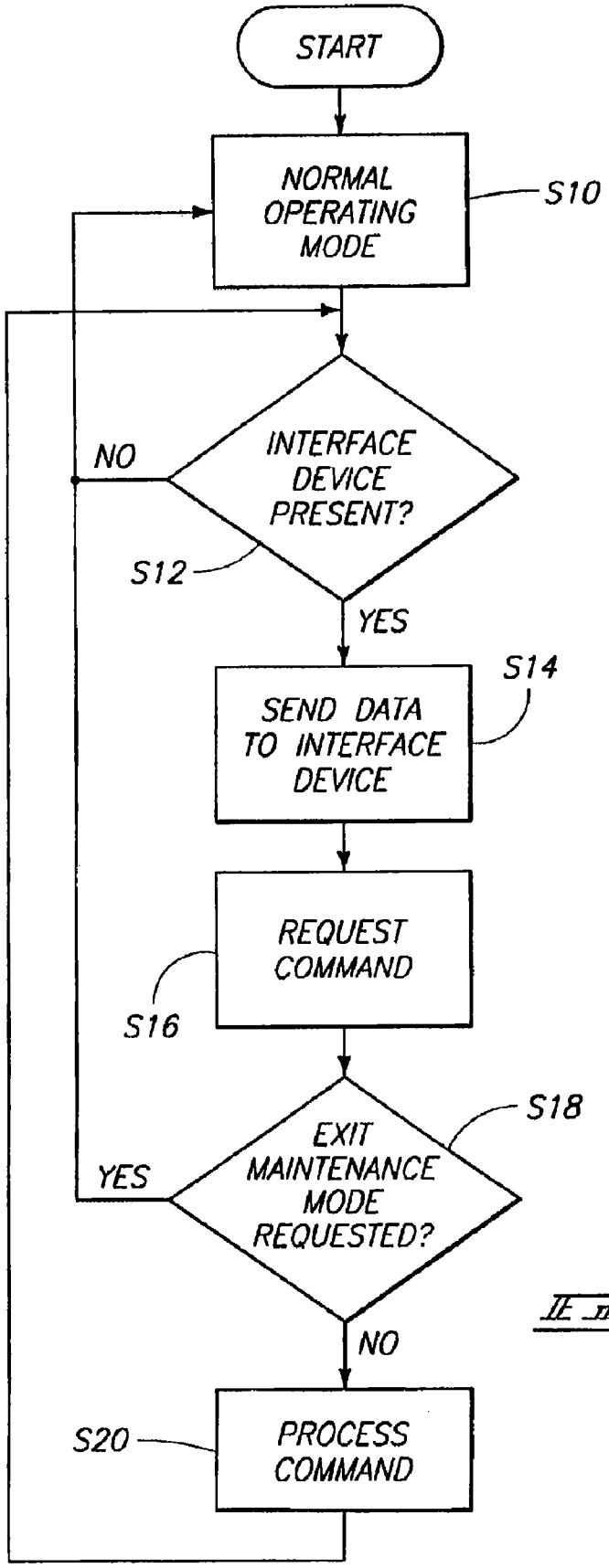
FIG. 9 is a flow diagram illustrating exemplary operations of the interrogator.

Referring to FIG. 9, a flow diagram is provided depicting operation of interrogator 26 within a normal mode and maintenance/calibration mode of operation in accordance with one embodiment of the invention.

At step S10, interrogator 26 communicates with remote communication devices 12 during the normal operating mode. First level data regarding the communications and/or interrogator status information can be collected within interrogator 26 during the normal mode of operation. Proceeding to step S12, interrogator 26 can determine whether an interface device 14 is present. Interrogator 26 monitors for the presence of the identification signal from interface device 14. In particular, interface device 14 is configured to output an identification signal within the reply link responsive to receiving the forward link communication signal from interrogator 26. If no interface devices are detected at step S12, interrogator 26 continues to operate in the normal operating mode of step S10.

If an identification signal from a corresponding interface device 14 is detected at step S12, interrogator 26 enters the maintenance/calibration modes of operation. Communications are established intermediate device 14 and interrogator 26 following detection of device 14. In the illustrated operation of interrogator 26, interrogator 26 outputs or downloads data to interface device 14 at step S14 responsive to the identification signal or other detection of device 14. Such data can include higher level data such as tag data corresponding communications with remote communication devices 12, status information of interrogator 26 (e.g., accumulation of first level data), etc.

Interrogator 26 is thereafter configured to request a command from interface device 14 at step S16. As such, interrogator 26 can be considered to be controlled by interface device 14. Such operation illustrates operation of interrogator 26 as a slave during the maintenance/calibration modes of operation. At step S18, interrogator 26 monitors whether interface device 14 has requested exiting of the maintenance mode of operation. Interrogator 26 returns to the normal operating mode at step S10 if such a command is received. If an exit request is not detected, interrogator 26 proceeds to step S20 to process the command received from interface device 14.

Thereafter, interrogator 26 proceeds to step S12 to determine whether the interface device 14 is still present within communications range. Alternatively, at step S18, the interrogator 26 can monitor for the presence of a timeout condition wherein no command is received from interface device 14. In a preferred embodiment, interrogator 26 is thereafter configured to return to normal operating mode S10 if a sufficient period of inactivity occurs or an exit command from interface device 14 is received. Interrogator 26 can communicate with device 12 before and after communicating with device 14.

For other configurations (e.g., installations concerned about security), a hardware or software based switch could be utilized to provide interrogator 26 into the maintenance/calibration mode of operation.

The present invention facilitates access to interrogators of communication systems, such as electronic identification systems. This is important since the interrogators may be located in inaccessible locations. Further, the present invention avoids the need to disassemble the interrogator (or the device wherein the interrogator is implemented) to establish a hard wire link with the interrogator. It is believed that the invention will reduce labor utilized to access interrogator information, and simplify the maintenance/calibration modes of operation minimizing the need for specialized technicians. Further, the impact upon ongoing operations performed by the interrogator are minimized through the use of non-invasive access techniques.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

[1. A system comprising:

an interrogator capable of operating in a normal mode and a maintenance mode;

wireless communication circuitry configured to communicate wireless signals including at least one of outputting data to the interrogator and receiving data from the interrogator; and a command control coupled with the wireless communication circuitry and being configured to output control signals to control the selection of operation of the interrogator between the normal mode and the maintenance mode.]

[2. The system according to claim 1 wherein the wireless communication circuitry and command control are implemented within an interface device.]

[3. The system according to claim 1 further comprising memory coupled with the wireless communication circuitry and configured to store at least one of data to be outputted and received data.]

[4. The system according to claim 1 further comprising a display device coupled with the wireless communication circuitry and configured to display data.]

[5. The system according to claim 1 further comprising an RF power meter configured to monitor the power of wireless communications of the wireless communication circuitry.]

[6. The system according to claim 5 wherein the interrogator is operable to receive data from the RF power meter and adjust communications responsive to the received data.]

[7. A wireless communication system comprising:

at least one remote communication device;

an interrogator configured to output a forward link wireless communication and receive a reply link wireless communication from the remote communication device responsive to the forward link wireless communication; and a maintenance device configured to interface with the interrogator using a wireless medium, the interrogator configured to detect the presence of the maintenance device and output data to the maintenance device responsive to the detection.]

[8. A communication method comprising:

providing an interrogator and at least one remote communication device;

communicating intermediate the interrogator and the remote communication device;

providing an interface device;

detecting the presence of the interface device using the interrogator;

reading control information from the interface device using the interrogator; and communicating data between the interrogator and the interface device responsive to the control information.]

[9. The method according to claim 8 further comprising displaying data using the interface device.]

[10. The method ac cording to claim 8 further comprising communicating information from the interrogator to the interface device responsive to the detecting.]

[11. The method according to claim 8 further comprising establishing communications intermediate the interrogator and the interface device responsive to the detecting.]

[12. The method according to claim 8 further comprising:

monitoring RF power of communications intermediate the interface device and the interrogator; and adjusting communication power of the interrogator responsive to the monitoring.]

[13. The method according to claim 8 further comprising storing data corresponding to at least one of the interrogator and the remote communication device using the interrogator.]

[14. The method according to claim 8 wherein the communicating intermediate the interrogator and interface device comprises communicating using a wireless medium.]

[15. The method according to claim 8 wherein the communicating with the remote communication device comprises communicating before and after the communicating with the interface device.]

[16. The method according to claim 8 wherein the communicating data with the interface device comprises reading data regarding the communications of the interrogator and the remote communication device from the interrogator.]

[17. The method according to claim 8 wherein the communicating data with the interface device comprises writing data configured to control communications with the remote communication devices to the interrogator.]

[18. The method according to claim 8 wherein the communicatings comprise communicatings using backscatter communications.]

[19. The method according to claim 8 wherein the communicating data comprises at least one of writing data to the interrogator and reading data from the interrogator.]

[20. The method according to claim 8 wherein the communicating data comprises reading interrogator status information from the interrogator.]

[21. The method according to claim 8 wherein the providing the interface device comprises coupling a processing device with a remote communication device.]

[22. A communication method comprising:

providing an interrogator and at least one remote communication device;

communicating intermediate the interrogator and the remote communication device;

providing an interface device;

detecting the presence of the interface device using the interrogator; and communicating data intermediate the interrogator and the interface device responsive to the detecting.]

*23. A system for performing radio frequency communications, the system comprising:*

*a first device comprising:*

*one or more first antennas; and*

*a first integrated circuit communicatively coupled to the one or more first antennas to communicate via the one or more first antennas using wireless communications, the first integrated circuit being configured to communicate in a first mode and a second mode; and*

*a second device comprising:*

*one or more second antennas; and*

*a second integrated circuit communicatively coupled to the one or more second antennas to communicate a first command to the first device via the one or more second antennas using wireless communications;*

*wherein the first device is configured to receive identification numbers from a plurality of radio frequency identification (RFID) tags in the first mode;*

*wherein the first device is configured to wirelessly provide the identification numbers to the second device via a spread spectrum communications technique in the second mode, the first device capable of receiving the identification numbers from the plurality of RFID tags without participation by the second device; and*

*wherein the one or more first antennas of the first device include an antenna to communicate with the plurality of the RFID tags and a separate antenna to communicate with the second device.*

*24. The system of claim 23, wherein at least one of the first device and the second device is an interrogator.*

*25. The system of claim 23, wherein at least one of the first device and the second device is a portable device.*

*26. The system of claim 23, wherein the first device and the second device are configured to communicate via broadband communications.*

*27. The system of claim 23, wherein at least one of the plurality of RFID tags is configured to communicate via backscatter.*

*28. The system of claim 23, wherein the first device is further configured to operate in a third mode, the third mode being a sleep mode to conserve power.*

*29. The system of claim 23, wherein at least one of the first device and the second device further comprises a battery.*

*30. The system of claim 23, wherein the each of the plurality of RFID tags corresponds to a product.*

*31. An interrogator comprising:*

*one or more memories;*

*a radio frequency (RF) section configured to handle two-way wireless communications with an interface device; and*

*a microcontroller communicatively coupled to the one or more memories and the RF section, the microcontroller configured to operate in a first mode and a second mode, at least one of the first mode and the second mode allowing the interrogator to receive data via the RF section from at least one radio frequency device;*

*wherein*

*the microcontroller determines identification information for each of at least one radio frequency device without presence of the interface device; and*

*the two-way wireless communications is configured to enable a transfer of a plurality of bits from the interrogator to the interface device; and to enable a transfer of a plurality of bits from the interface device to the interrogator; and*

*wherein the microcontroller is configured to receive control signals from the interface device via the RF section.*

*32. The interrogator of claim 31, wherein the two-way wireless communications includes communicating via wireless broadband communications.*

*33. The interrogator of claim 31, wherein the identification information is provided from the interrogator to the interface device.*

*34. A system for performing radio frequency communications, the system comprising:*

*a first device comprising:*

*one or more first antennas; and*

*a first integrated circuit communicatively coupled to the one or more first antennas to communicate via the one or more first antennas using wireless communications, the first integrated circuit being configured to communicate in a first mode and a second mode; and*

*a second device comprising:*

*one or more second antennas; and*

*a second integrated circuit communicatively coupled to the one or more second antennas to communicate a first command to the first device via the one or more second antennas using wireless communications;*

*wherein the first device is configured to receive identification information from at least one radio frequency device in the first mode;*

*wherein the first device is configured to wirelessly provide the identification information to the second device via a spread spectrum communications technique in the second mode, the first device configured to receive the identification information from the least one radio frequency device without participation by the second device; and*

*wherein the one or more first antennas of the first device includes an antenna to communicate with the at least one radio frequency device and a separate antenna to communicate with the second device.*

*35. A method for communicating data in a radio frequency system, the method comprising:*

*detecting, by a first device, a second device via a wireless communication of data, the first device operating in a first mode configured to wirelessly receive identification information from a plurality of remote communication*

*devices via a communication technique, the first device being capable of operating in the first mode without the second device, the first device including one or more antennas to communicate with the remote communication devices and the second device;*

*receiving at the first device control signals from the second device;*

*causing the first device to communicate in a second mode;*

*transferring data from the first device to the second device while the first device is in the second mode, the data including the identification information, the first device capable of using a spread spectrum communications technique; and*

*causing the first device to communicate in the first mode.*

*36. The method of claim 35, further comprising receiving at the first device configuration data from the second device.*

*37. The method of claim 36, wherein the configuration data comprises a software update code including a plurality of computer-executable instruction configured to be executed by the processing unit.*

*38. The method of claim 36, wherein the configuration data comprises configuration information related to the first device.*

*39. The method of claim 38, wherein the configuration information comprises hardware configuration.*

*40. The method of claim 38, wherein the configuration information comprises a user configurable setting.*

*41. The method of claim 38, wherein the configuration information comprises application settings.*

*42. The method of claim 35, wherein*

*the wireless communication of data is effected via a first wireless communications protocol; and*

*the transfer of data from the first device to the second device is effected via a second wireless communication protocol, the second protocol different from the first protocol.*

*43. The method of claim 42, wherein:*

*the wireless communication of data is effected via a first antenna module, and*

*the transfer of data from the first device to the second device is effected via a second antenna module.*

*44. A method for communicating data in a radio frequency system, the method comprising:*

*detecting, by a first device, a second device via a wireless communication of data, the first device operating in a first mode enabled to wirelessly receive identification information from a plurality of remote communication devices via a communication technique, the first device being capable of operating in the first mode without the second device, the first device including one or more antennas to communicate with the remote communication devices and the second device;*

*receiving at the first device control signals from the second device; and*

*transferring data from the first device to the second device, the data including the identification information, the first device capable of using a spread spectrum communications technique.*

*45. The method of claim 44, wherein:*

*the wireless communication of data is effected via a first wireless communications protocol; and*

*the transfer of data from the first device to the second device is effected via a second wireless communication protocol, the second protocol being different from the first protocol.*

*46. The method of claim 45, wherein:*

*the wireless communication of data is effected via a first antenna module, and*

*the transfer of data from the first device to the second device is effected via a second antenna module.*

*47. The method of claim 45, further comprising:*

*causing the first device to communicate in a second mode;*

*receiving at the first device configuration data from the second device while the first device is in the second mode; and*

*causing the first device to communicate in the first mode.*

*48. The method of claim 44, further comprising:*

*causing the first device to communicate in a second mode;*

*receiving at the first device configuration data from the second device while the first device is in the second mode; and*

*causing the first device to communicate in the first mode.*

*49. The method of claim 48, wherein the configuration data comprises a software update code including a plurality of computer-executable instruction configured to be executed by the processing unit.*

*50. The method of claim 48, wherein the configuration data comprises configuration information related to the first device.*

*51. The method of claim 50, wherein the configuration information comprises hardware configuration.*

*52. The method of claim 50, wherein the configuration information comprises user configurable settings.*

* * * * *